United States Patent
Berger et al.

(10) Patent No.: US 7,254,656 B2
(45) Date of Patent: Aug. 7, 2007

(54) METHOD AND SERVICE AND COMPUTER PROGRAM CODE FOR BROADCAST OF INTERFACE GROUP BRING-UP IN A MULTIPROCESSOR COMPUTER SYSTEM HAVING MULTIPLE NODES

(75) Inventors: Derrin M. Berger, Poughkeepsie, NY (US); Jonathan Y. Chen, Poughkeepsie, NY (US); Thomas E. Gilbert, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/987,657

(22) Filed: Nov. 13, 2004

(65) Prior Publication Data

US 2006/0106556 A1  May 18, 2006

(51) Int. Cl.
*G06F 13/00* (2006.01)
(52) U.S. Cl. .............................. 710/104; 710/10; 713/1
(58) Field of Classification Search ................ 710/104, 710/10; 713/1–100
See application file for complete search history.

(56) References Cited

U.S. PATENT DOCUMENTS

| | | | | |
|---|---|---|---|---|
| 4,868,783 A | * | 9/1989 | Anderson et al. | 710/104 |
| 6,018,815 A | * | 1/2000 | Baeg | 714/726 |
| 6,065,069 A | * | 5/2000 | Klein | 710/15 |
| 6,112,258 A | * | 8/2000 | Miller et al. | 710/19 |
| 6,334,163 B1 | | 12/2001 | Dreps et al. | 710/129 |
| 6,671,753 B2 | | 12/2003 | Dreps et al. | 710/60 |
| 6,832,273 B2 | * | 12/2004 | Ray et al. | 710/42 |
| 2002/0085578 A1 | * | 7/2002 | Dell et al. | 370/422 |
| 2003/0021223 A1 | * | 1/2003 | Kashyap | 370/217 |
| 2004/0062251 A1 | * | 4/2004 | Johansson et al. | 370/395.52 |
| 2004/0139193 A1 | * | 7/2004 | Refai et al. | 709/224 |
| 2004/0260834 A1 | * | 12/2004 | Lindholm et al. | 709/238 |
| 2006/0015712 A1 | * | 1/2006 | Ang et al. | 713/100 |

OTHER PUBLICATIONS

Structured Computer Organiztion, Third Edition, Andrew S. Tanenbaum, 1976, pp. 11-13.*

* cited by examiner

*Primary Examiner*—Paul R. Myers
(74) *Attorney, Agent, or Firm*—Lynn L. Augspurger

(57) ABSTRACT

A method and hardware design is disclosed for allowing the bring-up of a large scale system of interfaces that need to undergo a sequence of calibration steps. The method involves the use of a flexible broadcast scheme whereby groups of interfaces within a chip are assigned to groups to which commands can be broadcast. The scheme allows for the maximum amount of flexibility, allowing interfaces to be assigned to multiple groups which can overlap and be subsets of one another, and still allows for groups to be excluded from broadcast commands and be access individually. A method is also disclosed for using a chip-global status summary that can be accessed as any other register on the chip and can report calibration results for an entire chip with only one command. According to the invention a service utilizing the method embodied with code for implementing the method can now be provided.

20 Claims, 4 Drawing Sheets

METHOD AND SERVICE AND COMPUTER PROGRAM CODE FOR BROADCAST OF INTERFACE GROUP BRING-UP IN A MULTIPROCESSOR COMPUTER SYSTEM HAVING MULTIPLE NODES

TRADEMARKS

IBM® is a registered trademark of International Business Machines Corporation, Armonk, N.Y., U.S.A. and other names used herein may be registered trademarks, trademarks or product names of International Business Machines Corporation or other companies.

BACKGROUND OF THE INVENTION

1 Field of the Invention

This invention relates to a method and service for performing symmetrical multi-processor (SMP) computer system bring-up, and particularly to parallelizing operations while maintaining granularity flexibility while sending commands and gathering status over a multi-node system.

2. Description of Background

In large-scale systems using an Elastic Interface which is the subject of U.S. Pat. No. 6,671,753 issued Dec. 30, 2003; U.S. Pat. No. 6,571,346 issued May 27, 2003 and U.S. Pat. No. 6,334,163 issued Dec. 25, 2001 and entitled "Elastic interface apparatus and method therefor" and characteristic of IBM's computer systems, the Elastic Interface is calibrated for the system. Running a system through an Elastic Interface calibration & diagnostic sequence presents two problems. A large-scale computer system such as those provided by IBM have multiple nodes and a many elastic interfaces use to interconnect the various chips and modules of these systems, so a first problem could be said to be: "How do you send commands and read status to/from the interface/s?", and a second problem could be said to be: "How do you speed up the entire process when there can be hundreds of interfaces that need to be calibrated?".

Other methods are typically geared toward small-scale systems where only a few interfaces need to be calibrated and bring-up time is not an issue. Our solution is applicable to multiple interface systems, but in these small scale other systems, hardware (such as hard coded counters) are used to trigger controls and status is allocated to a small number of registers. The current, large scale system and more complex Elastic Interface requires the ability to gather status more quickly and set a larger number of registers for each interface.

SUMMARY OF THE INVENTION

Our invention allows calibration to be achieved taking advantage of hardware already in place for system bring-up and apply it to Elastic Interface control. This system implementation provide controls and gather status on a per-interface basis while maintaining enough broadcast granularity to take advantage of operations that can be done in parallel. While providing a system that allows flexible granularity so that operations can be performed on a per-interface basis if necessary, but which also is during bring up broadcast to selected interfaces throughout the system, the time required for the bring up and interface calibration process is substantially reduced. In accordance with the preferred embodiment, this is accomplished by assigning interfaces to broadcast groups which are configured as part of the initialization sequence. This is done as a service for setting scan latches at INPA (initial pattern) or hardware initialization, as can be done with program code established for this purpose. A set of centralized latches on each chip in the system maintains the group assignments. Once the broadcast group assignments are in place, calibration commands can be sent using pre-existing hardware to any combination of groups in parallel, as well as targeting interfaces individually. After system calibration commands are sent, the same hardware can be used to gather a status summary for each interface on the chip using only one command.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
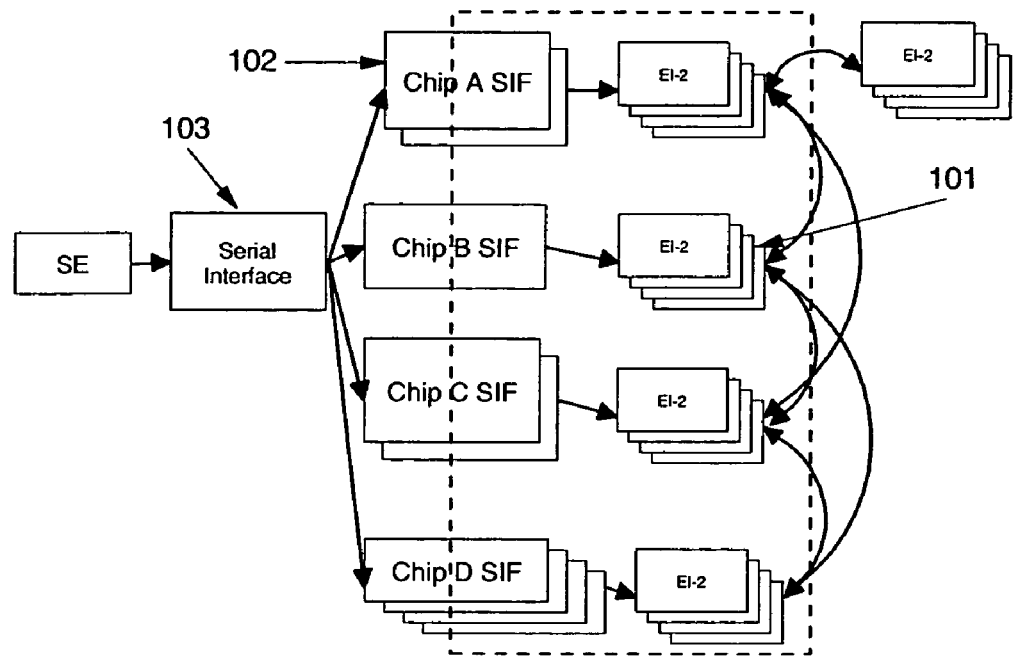
FIG. 1 illustrates one example of a system that makes use of Elastic Interfaces across multiple chips.

This invention can be employed both for a newly configured system, or in the field, even after a "hot" replacement of a system module. After a new system is configured or reconfigured, the invention can be employed. Before bring up, the first step in using this invention is to identify which interfaces throughout a newly configured or reconfigured system will need to undergo an Elastic Interface calibration during bring-up and initialization. FIG. 1 depicts a system in which several interfaces, 101, need to be calibrated across multiple chips on the node. This same configuration, or variations may exist on other nodes within the system.

Each node also would contain a service element (SCE) used to control system operations by sending commands and reading data through a serial interface (SIF), 103.

In accordance with our preferred embodiment the serial interface (SIF 103) is a bit wide interface. The interfaces comprises a one bit serial interface, to pass between a service element to clock chip and from the clock chip to all of the chips on a multi-chip module of a node for taking advantage of broadcasting to the various chips on the multi-chip module though the serial interface. For off chip, communication is via a JTAG from the FSP, and no broadcast is undertaken. In implementing our invention, we maintain the ability to implement a system calibration that can provide controls and gather status on a per-interface basis, and our new process enables continuation of that capability and expanding that by providing enough broadcast granularity to take advantage of operations that can be done in parallel. Typically, this structure is used to write to or read from registers located on any or all of the chips within the calibrated computer system, 102, to either perform initializations during system bring-up or read critical data during mainline system function or "hot" reconfiguration.

The serial interface, 103, to chip, 102, hardware generally facilitates write, read, set, and reset commands to a set of registers on each chip that are allocated by a finite address space.

Figure 2:
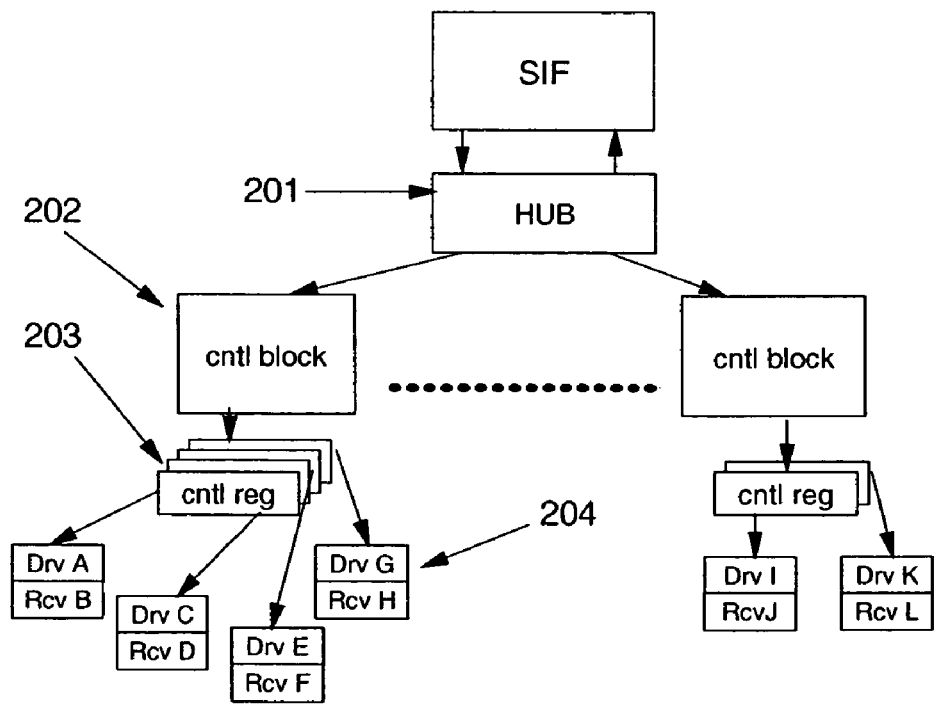
FIG. 2 illustrates one example of the hardware configuration used to transmit commands from a serial interface to the interfaces to calibrate.

Turning to FIG. 2, we see the structure and hierarchy of hardware used to transmit data from the SIF to the interfaces to be calibrated. Commands from the SIF are received by a hub, 201, which is located on each chip and is the highest level of hierarchy in the data path. The hub logic, 201, controls and sends commands to the next level of hierarchy, a control block, 202.

Each control block, 202, passes commands and data through to the lowest level of hierarchy, the control registers themselves, 203, which in turn, communicate directly with each interface, 204. In all figures included, we show the control registers being shared between driver/receiver pairs. As the nature of the calibration control allows, it is possible to share a control register, 203, between interfaces providing there will be no conflicts. Note in that the interface pairs, 204, are not drivers and receivers on opposite ends of the same bus. Instead, for every "driver A and receiver B" that is being controlled by one set of registers, there is a "receiver A and driver B" being controlled by another set of registers on a different chip. This setup helps allow common hardware to be used throughout the design without the need for additional hardware to maintain a proper calibration sequence.

Figure 3:
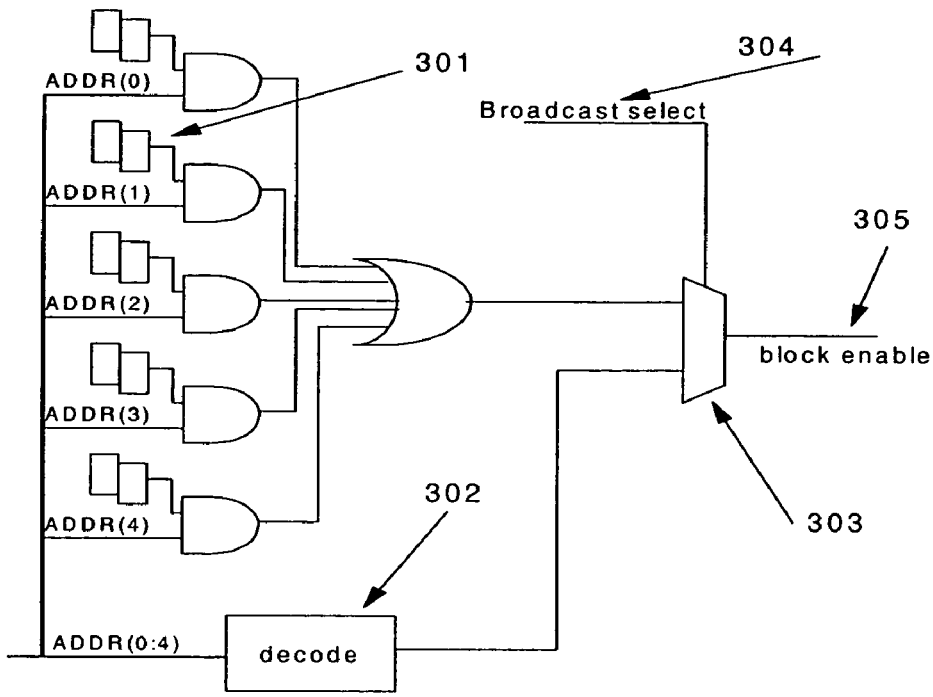
FIG. 3 illustrates the hardware used to assign broadcast groups and to perform the selection of broadcast vs. non-broadcast commands.

Turning to FIG. 3, we show how the hardware can support two modes of operation: one for broadcast commands, and one for targeting individual interfaces directly. In order for any command or data to be sent to the control blocks, a block enable, 305, must be active. When a broadcast mode bit, 304, is active during the command, the block enable is set if it is assigned to a broadcast group being addressed, otherwise, it is only set if it is directly addressed by a portion of the address bits sent with the command, 303.

An individual command mode works as follows: A command is sent through the SIF, 103, to the hub, 201. The portion of the command that selects between broadcast and individual mode is set to choose individual mode. This can be done before bring up or dynamically in the case of need. The address bits that are sent with the command go through a normal decode, 302, to set a block enable for only one of the blocks that are driven by the hub on this particular chip. Once the block enable is set, the command is sent to the next level of hierarchy, 202, where another level of decoding is done to drive the appropriate control register.

A broadcast command mode would work as follows: A command is sent through the SIF, 103, to the hub, 201. The portion of the command that selects between the broadcast and individual mode would be set to choose broadcast mode. The address bits that are sent with the command are compared with group assignment latches, 301 to determine all blocks that should be enabled with this broadcast address. Note that although only one set of group assignment latches is shown in FIG. 3 for the purpose of a generic illustration. There is in the preferred embodiment actually one set of latches for each block that the hub, 201, drives, which are duplicates of the group shown in FIG. 3.

An example configuration may be as follows using a 7-bit address: We have each hub drive eight blocks, and each interfaces requires four control registers. 2-bits of the address must be used to select the target control register for each interface, regardless of the command. In individual mode, the most significant 3-bits would be used to select one out of the possible 8 blocks we allocated, the remaining 2-bits would be used to select the interface being driven by that block. In broadcast mode, all 5-bits that remain from the address would be used as group bits. As a result, each hub would need 40 group assignment latches, 5 per each of 8 blocks allowing each block to compare against the 5 bits of the address.

Figure 4:
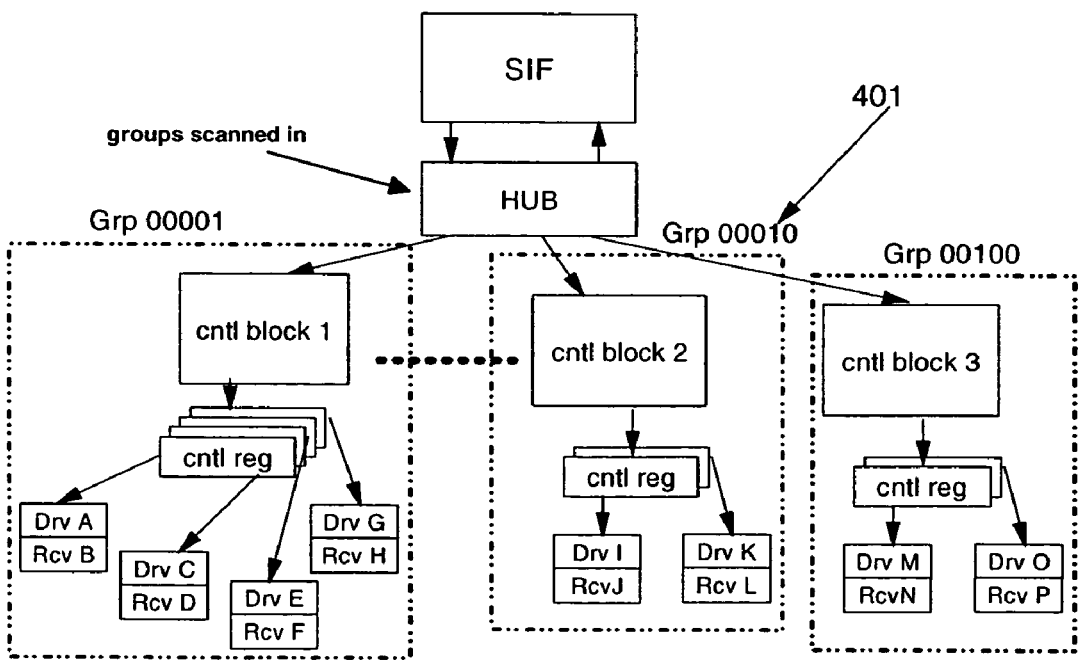
FIG. 4 illustrates one example of an assignment of broadcast groups.

Turning to FIG. 4, we see an example of a group assignment in which blocks are assigned to separate groups. During initialization, the group assignment latches in each hub are set for each group. For example, control block 2 has its set of 5-latches set to "00010", 401, and control block 1 has its set to "00001". When the broadcast command is received by the hub with the address "00010", only control block 2 and the interfaces it controls will get the command. If the address sent was "00011", both groups would be active.

Figure 5:
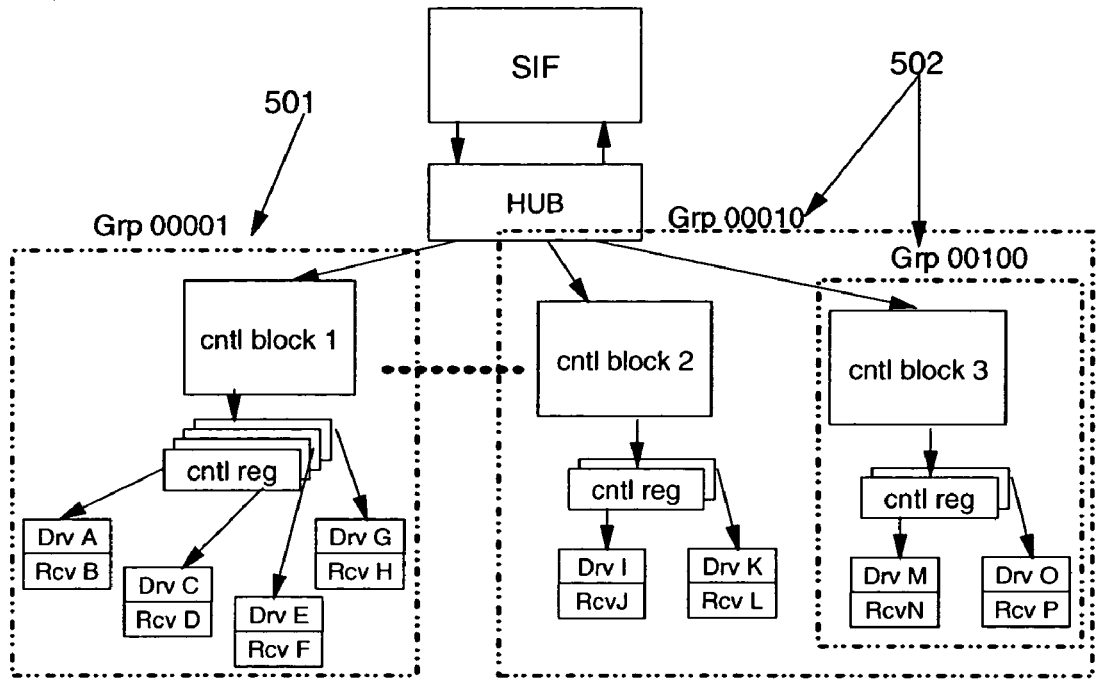
FIG. 5 illustrates one example of an assignment of broadcast groups wherein one group is a subset of another.

Turning to FIG. 5, we see an example of a group assignment in which blocks are assigned to multiple groups that overlap. During initialization, the group assignment latches in each hub are set for each group. For example, control block 1 has its set of 5-latches set to "00001", 501. Control block 2 would be set to "00010", while control block 3 would be set to "00110". This means that if the broadcast address sent was "00010", both blocks 2 and 3 would be active, while an address of "00100" mean only group 3 would be active, 502. In this case, sending a broadcast address of "00110" would be the equivalent of sending address "00100" because both groups are assigned to that address.

Figure 6:
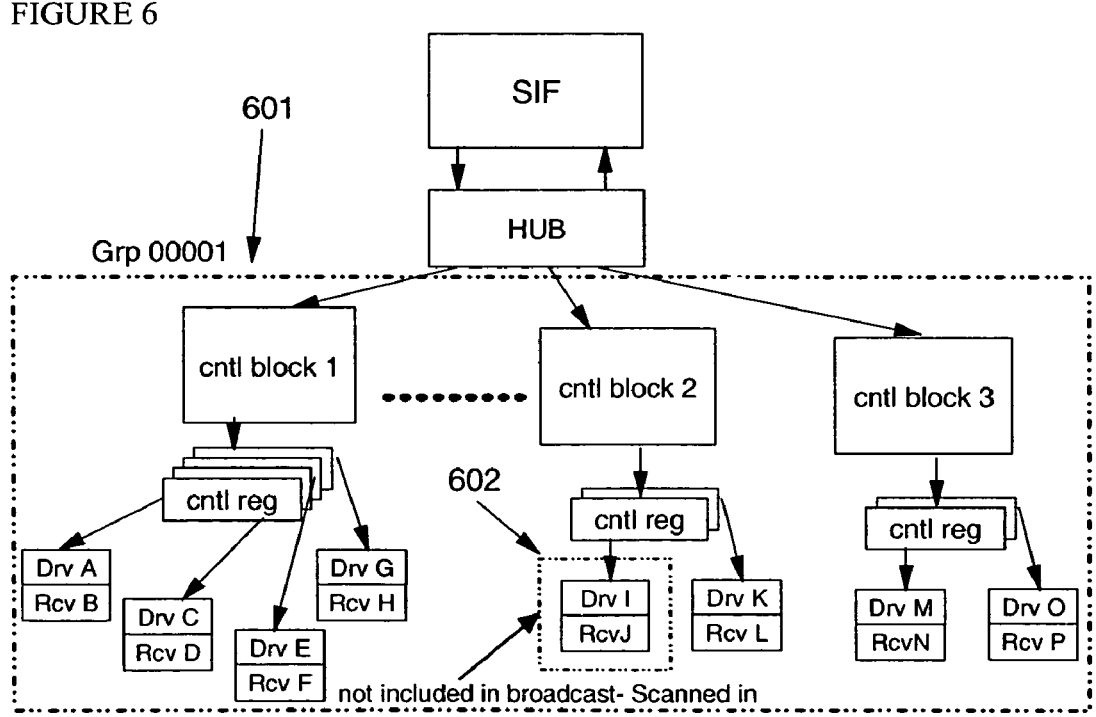
FIG. 6 illustrates one example of an assignment of broadcast groups wherein the group consists of all interfaces on the chip except for an interface to be excluded from all broadcast commands.

Turning to FIG. 6, we see an example of a group assignment in which all blocks control by this particular hub are assigned to the same group, however, one interface is being excluded. At the second level of hierarchy, 202, is logic similar to that used in the hub, FIG. 3, which is used to enable and disable interfaces from being included in broadcast commands. In this case, when a broadcast command is received by a group, a check is then done by the hardware to gate the command from getting to any interface that has a broadcast enable latch turned off. During initialization, these latches would also be scanned to their proper values based on what is desired by the bring-up sequence. In the example in FIG. 6, all interfaces on the chip are part of group "00001", 601. In control block 2, there is one latch for each interface that determines whether or not an interface should be included in a broadcast command. In this case, the registers that control driver I and receiver J are set to be excluded, 602.

Figure 7:
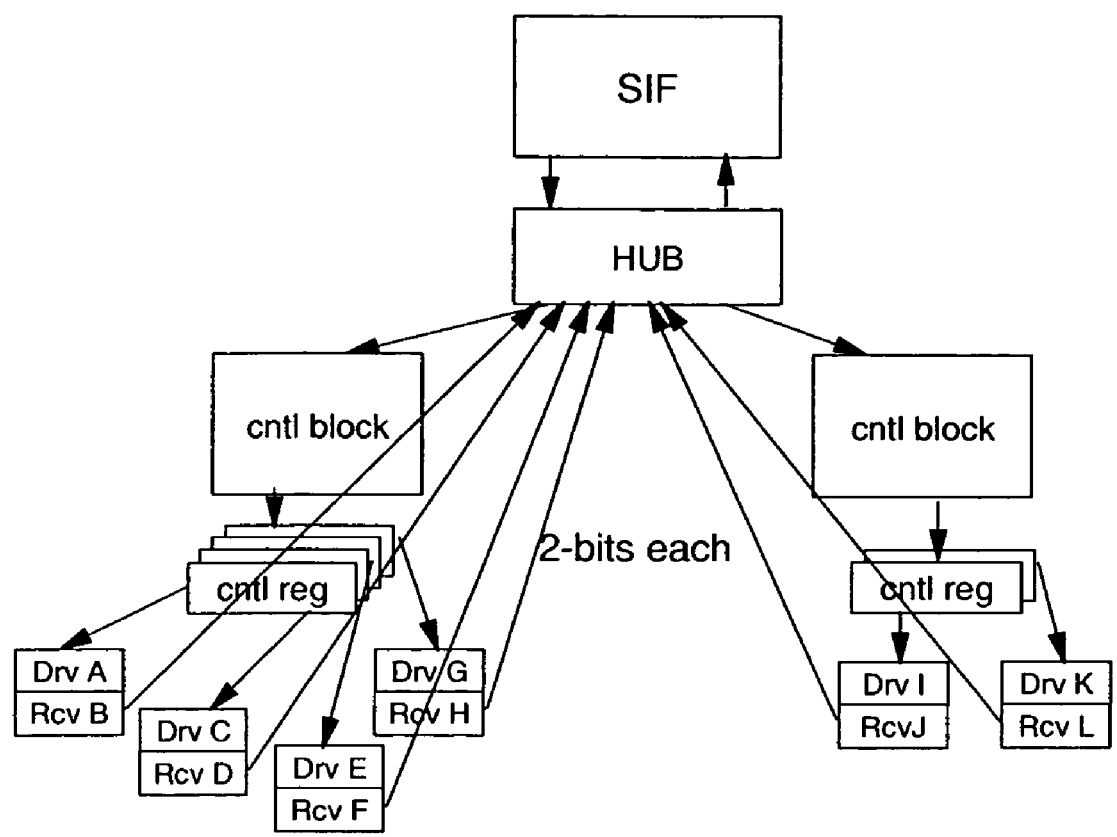
FIG. 7 illustrates the configuration of hardware and flow of data for collecting global status from each chip.

Turning to FIG. 7, we have illustrated an example used for transmitting status information. A typical Elastic Interface calibration status for each interface is reported through 16-bits and for small-scale systems can be read out individually. For larger systems that have many more interfaces and can make use of broadcast features it is more efficient to gather a summary of the status for each interface and transmit the data back to the service element with one operation.

The calibration status for each interface is reduced from a detailed status (including various post-calibration settings, etc.) to one of four possible outcomes, represented by 2-bits. For example, "00" means no calibration was done, "01" means calibration was successful, "10" means calibration failed, and "11" means calibration finished but with some non-fatal warnings.

The two bits of status for each interface are tied directly to the hub, 201, and pulled together to form a field the same width as any of the low-level control registers. This allows the same interface (i.e. SIF, 103) to accept and transmit the status data back to the service element just as it would for any other data being read. When the hub receives a broadcast-read command, no blocks are activated. Instead, the status summary data is returned directly by the hub, without having to send any commands further down the hierarchy. For a detailed status read, an individual mode command (non-broadcast) can be sent to read the specified interfaces one at a time.

The capabilities of the present invention can be implemented in software, firmware, hardware or some combination thereof.

As one example, one or more aspects of the present invention can be included as part of an installation service for a computer system or module update thereof. Included in this service can be the utilization of not only an article of manufacture (e.g., one or more computer modules) having, for instance, computer usable code in register storage media for setting the latches of the computer modules with code. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are examples. There may be many variations to these exemplars and the diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for calibration of interfaces in a computer system that has multiple interfaces across multiple chips and nodes, comprising:
    performing with hardware of said computer system a hardware initialization
    by setting scan latches group assignments for interfaces in said computer system to be calibrated establishing a plurality of broadcast groups, each group assignment becoming after group assignment an identification of said interfaces as part of a specific one of said plurality of broadcast groups, and
    once said broadcast groups are established, during initialization sending calibration commands to the interfaces using pre-existing hardware to a selected combination of said groups in parallel for performing reads and writes as part of a broadcast group.

2. The method according to claim 1, including a process of exclusion of an interface from broadcast group commands by a setting of control scan latches in said hardware of said computer system to exclude a specific interface from broadcast commands.

3. The method according to claim 1 wherein said process of setting scan latch group assignments for interfaces of said computer system enables an alternative direct access to any selected interface of said computer system for individual access and calibration.

4. The method according to claim 3 wherein after said computer system has completed bring up operations and calibration of elastic interfaces which are part of a group assignment, a selected elastic interface is enabled for reads and writes individually on a per interface basis to allow the individual access of each elastic interface selected for individual access.

5. The method according to claim 3, where interfaces in said plurality of broadcast groups are first calibrated, and subsequently a specific elastic interface is individually calibrated.

6. The method according to claim 1, wherein flexible broadcast groups are assigned by using dedicated latches that are compared to address bits during a broadcast command.

7. The method according to claim 1, wherein selected interfaces are excluded from broadcast commands with the use of dedicated latches.

8. The method according to claim 1 wherein the calibration process collects calibration status for an entire chip in a computer system design using an operation by having a status summary centrally tied on the chip and accessible for reads through hardware already in place.

9. The method according to claim 1 wherein a serial interface is provided and used to access an elastic interface in said hardware of said computer system during bring up of said computer system for broadcast to said elastic interfaces for calibration.

10. A service for use in a computer system initiation, comprising the steps of calibration of interfaces in a computer system that has multiple interfaces across multiple chips and nodes by
    performing with hardware of said computer system a hardware initialization
    by setting scan latches group assignments for interfaces in said computer system to be calibrated establishing a plurality of broadcast groups, each group assignment becoming after group assignment an identification of said interfaces as part of a specific one of said plurality of broadcast groups, and
    once said broadcast groups are established, during initialization sending calibration commands to the interfaces using pre-existing hardware to a selected combination of said groups in parallel for performing reads and writes as part of a broadcast group.

11. The service according to claim 10, including a process of exclusion of an interface from broadcast group commands by a setting of control scan latches in said hardware of said computer system to exclude a specific interface from broadcast commands.

12. The service according to claim 11 wherein said process of setting scan latch group assignments for interfaces of said computer system enables an alternative direct access to any selected interface of said computer system for individual acess and calibration.

13. The service according to claim 12 wherein after said computer system has completed bring up operations and calibration of elastic interfaces which are part of a group assignment, a selected elastic interface is enabled for reads and writes individually on a per interface basis to allow the individual access of each elastic interface selected for individual access.

14. The service according to claim 13, where interfaces in said plurality of broadcast groups are first calibrated, and subsequently a specific elastic interface is individually calibrated.

15. The method according to claim 10, wherein flexible broadcast groups are assigned by using dedicated latches that are compared to address bits during a broadcast command.

16. The method according to claim 10, wherein selected interfaces are excluded from broadcast commands with the use of dedicated latches.

17. The method according to claim 10 wherein the calibration process collects calibration status for an entire chip in a computer system design using an operation by having a status summary centrally tied on the chip and accessible for reads through hardware already in place.

18. The method according to claim 10 wherein a serial interface is provided and used to access an elastic interface in said hardware of said computer system during bring up of said computer system for broadcast to said elastic interfaces for calibration.

19. A computer system media for storage of and providing program code for execution by said computer system for calibration of interfaces in a computer system that has multiple interfaces across multiple chips and nodes, comprising:

a code set for establishing the setting of scan latches group assignments for interfaces in said computer system to be calibrated establishing a plurality of broadcast groups, each group assignment becoming after group assignment an identification of said interfaces as part of a specific one of said plurality of broadcast groups whereby once said broadcast groups are established, during initialization the program code establishes paths in said computer system for sending calibration commands to the interfaces using pre-existing hardware to a selected combination of said groups in parallel for performing reads and writes as part of a boardcast group.

20. The computer system media according to claim 19, including an exclusion code for exclusion of an interface from broadcast group commands for a setting of control scan latches in said hardware of said computer system to exclude a specific interface from broadcast commands.

* * * * *